United States Patent [19]

Kanda et al.

[11] Patent Number: 5,822,183

[45] Date of Patent: Oct. 13, 1998

[54] MEMORY CARD INSTALLING DEVICE

[75] Inventors: Yamato Kanda, Hachioji; Toshikazu Kato, Hino, both of Japan

[73] Assignee: Olympus Optical Co. Ltd., Tokyo, Japan

[21] Appl. No.: 842,127

[22] Filed: Apr. 23, 1997

[30] Foreign Application Priority Data

Apr. 25, 1996 [JP] Japan ..................................... 8-105739
Apr. 25, 1996 [JP] Japan ..................................... 8-105740

[51] Int. Cl.[6] ................................. G06F 1/16; H05K 7/12
[52] U.S. Cl. ........................... 361/684; 361/737; 439/136
[58] Field of Search .................................... 361/683, 684, 361/737, 752, 730, 728; 439/131, 135, 136–140; 364/108.1; G06F 1/16

[56] References Cited

U.S. PATENT DOCUMENTS

| | | | |
|---|---|---|---|
| 4,775,327 | 10/1988 | Normann et al. ........................ | 439/140 |
| 4,940,414 | 7/1990 | Lee ........................................... | 439/131 |
| 5,035,633 | 7/1991 | Kobayashi et al. ..................... | 439/140 |
| 5,408,384 | 4/1995 | Gannyo et al. ......................... | 361/737 |
| 5,559,672 | 9/1996 | Buras, Jr. et al. ...................... | 361/684 |
| 5,688,134 | 11/1997 | Hirata ...................................... | 439/136 |

*Primary Examiner*—Lynn D. Feild
*Attorney, Agent, or Firm*—Kenyon & Kenyon

[57] ABSTRACT

A memory card installing device has a memory card installing portion that includes a connector. The installing device also includes a lid for opening and closing the memory card installing portion and a connector cover for covering the connector when the memory card is not installed in a predetermined position and the lid is closed.

11 Claims, 6 Drawing Sheets

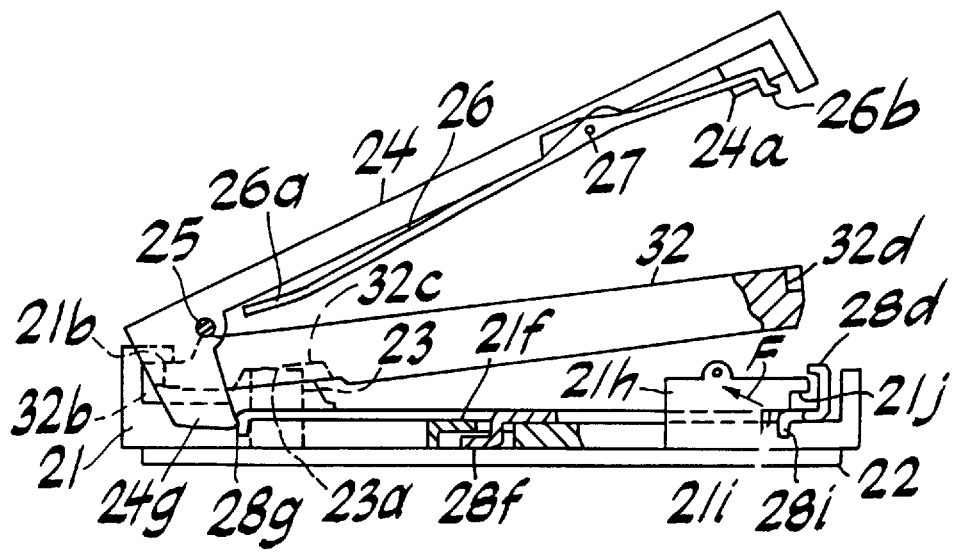

MEMORY CARD INSTALLING DEVICE

BACKGROUND OF THE INVENTION

1. Field of the Invention

This invention relates to a memory card installing device.

2. Description of the Related Art

Recently, various kinds of electronic devices utilizing a removable memory card incorporating a solid-state memory are on the market and used by users in general. Such electronic devices are provided with a multi-contact connector portion in which the connector of the memory card is installed. The contacts are made of gold or the like.

When the connector portion of the memory card is inserted in the contact connector portion, an electrical connection is made so that information can be transmitted between the memory card and the electronic device.

However, the memory card is not always installed in the electronic device. The electronic device may be used or stored without the memory card. Even though the electronic device is provided with a casing cover for protecting the memory card, there is not a protective cover directly covering the contact connector portion.

Thus, when the memory card is removed for a long time, dust may settle on the contacts of the connector of the electronic device. When the memory card is replaced to the connector portion, it may be impossible to transmit information to and from the memory card, if any contact fails to contact because of the dust.

SUMMARY OF THE INVENTION

An object of this invention is to provide a memory card installing device which can prevent dust from entering into a connector portion when a memory card is not installed.

According to this invention, a device for installing a memory card comprises a memory card installing portion having a connector portion; a lid for opening and closing the memory card installing portion; and a connector cover member for covering the connector portion when the memory card is not installed at a predetermined position and the lid is closed.

BRIEF DESCRIPTION OF THE DRAWINGS

FIG. 10 is a cross-sectional view showing a state of the memory card installing device of FIG. 7 in which the lid is being opened to remove the memory.

FIG. 11 is a cross-sectional view showing a state of the memory card installing device of FIG. 7 in which the lid is completely opened to remove the memory.

DETAILED DESCRIPTION OF THE PREFERRED EMBODIMENTS

Figure 1:
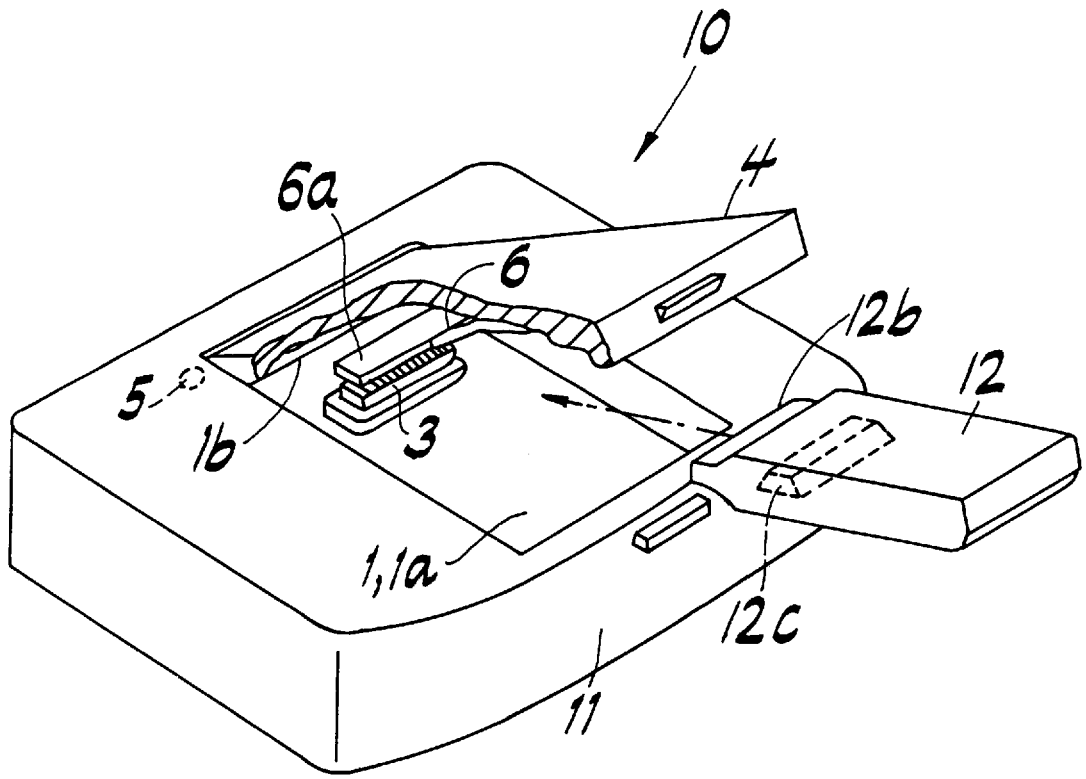
FIG. 1 is a perspective view of an electronic device incorporating a memory card installing device according to a first embodiment of this invention, and a memory card to be installed.

Referring to the drawings, embodiments of this invention will now be described.

FIG. 1 is a perspective view of an electronic device 10 incorporating a memory card installing device according to a first embodiment of this invention, and a memory card 12 to be installed A main body 1 of the electronic device 10 is provided with a memory card installing portion 1a, and also with a connector portion 3 made of a conductive rubber or the like having conductive multilayers laminated at minute intervals and a conductivity that is oriented in a predetermined direction (mainly a vertical direction.) The memory card installing portion 1a can be opened and closed by a lid 4 rotatably supported by a supporting shaft 5.

A plate spring 6, which is an elastic member, is secured to the lid 4 on the side of the installing portion 1a. As shown in a perspective view of FIG. 2, the plate spring 6 is formed of an elastically deformable T-shaped thin plate and has a cover portion 6a which can cover a contacting surface 3a for contacting a connector portion 12c of the memory card 12 (see FIG. 3). The plate spring 6 has securing holes 6b for securing the plate spring 6 to the lid 4.

Next, the operation of installing and removing the memory card 12 in and from the electronic device 10 thus constructed is described by referring to FIG. 1 and FIGS. 3 to 5, which show cross-sectional views of the installed or removed state of the memory card. A casing 11 of the device 10 is omitted in FIGS. 3 to 5.

Figure 3:
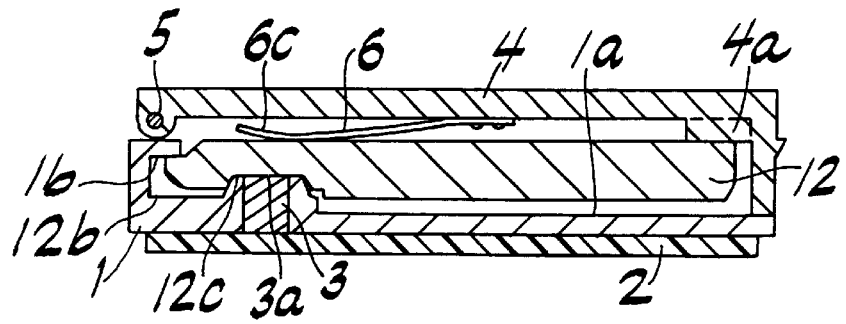
FIG. 3 is a cross-sectional view showing a state of the memory card installing device of FIG. 1 in which the memory card is inserted and a lid is closed.

With the lid 4 opened, the memory card 12 is inserted in the electronic device 10 from a direction as shown in FIG. 1. A front end portion 12b of the memory card 12 is inserted in an inserting portion 1b of the main body 1 of the device 10 and the lid 4 is completely closed, as shown in the cross-sectional view of FIG. 3, which shows the installed state of the memory card. In FIG. 3, the front end portion 12b of the memory card 12 is supported by the inserting portion 1b of the main body 1 and the opposite end portion of the memory card 12 is pushed down by a pushing portion 4a of the lid 4. Thus, the connector portion 3 of the main body 1 and the connector portion 12c of the memory card 12 contact with each other at a predetermined position and are electrically connected. The lid 4 is maintained in the closed state of FIG. 3 by a locking member, such as a pawl or the like. The plate spring 6 interposes between the lid 4 and the memory card 12 and maintains its deformed state.

The connector portion 3 of the main body 1 is always electrically connected with a printed board 2. When the memory card 12 is installed, the electronic device 10 can capture data of the memory card 12.

Figure 4:
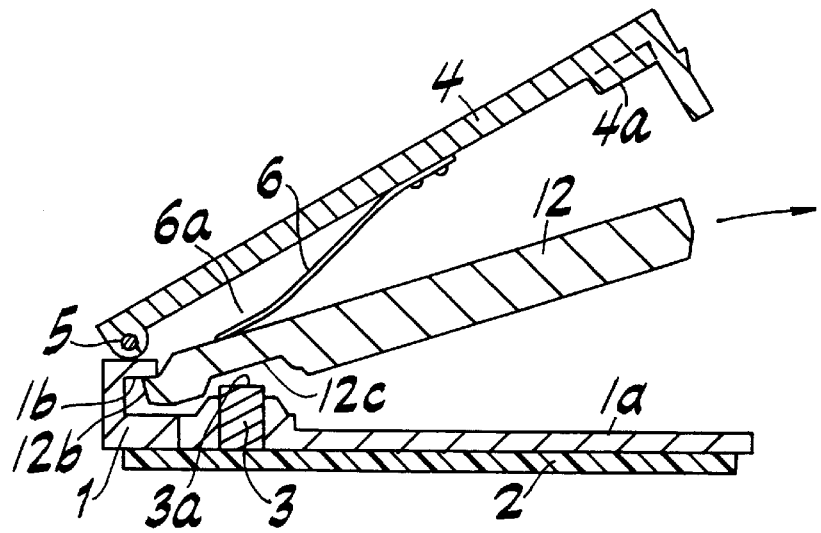
FIG. 4 is a cross-sectional view showing a state of the memory card installing device of FIG. 1 in which the lid is opened to remove the memory.

When removing the memory card 12 from the installing portion 1a of the device 10, as shown in FIG. 4, the lid 4 is opened and the memory card 12 is removed. The memory card 12 can be easily removed because the memory card 12 is pushed down by the plate spring 6 and is spaced from the lid 4.

Figure 5:
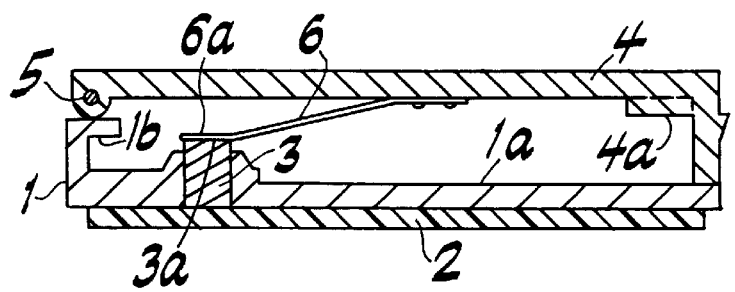
FIG. 5 is a cross-sectional view showing a state of the memory card installing device of FIG. 1 in which the lid is closed after the memory card is removed.

After the memory card 12 is removed and the lid 4 is closed, as shown in FIG. 5, the cover portion 6a of the plate spring 6 contacts and covers the contacting surface 3a of the connector portion 3 of the main body 1. At this time, the plate spring 6 is elastically deformed and the cover portion 6a contacts the connector portion 3 by a predetermined urging force. Thus, a gap will be seldom left between the contacting surface 3a and the cover portion 6a. Further, because the plate spring 6 is T-shaped, even if the plate spring 6 is not precisely parallel to the connecting surface 3a, the cover portion 6a fits to the contacting surface 3a so that the gap becomes minimal.

Therefore, even if the electronic device 10 is stored or used for a long time without the memory card 12 inserted, dust will not settle on the contacting surface 3a. Thus, when the lid 4 is opened again and the memory card 12 is installed, the electronic device 10 can be operated normally.

Figure 2:
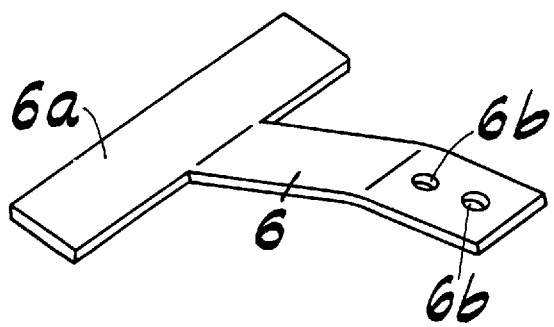
FIG. 2 is a perspective view of a plate spring applied to the memory card installing device of FIG. 1.
Figure 6:
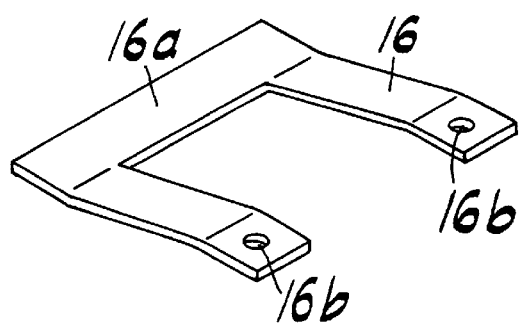
FIG. 6 is a perspective view of a variation of the plate spring applied to the memory card installing device of FIG. 1.

FIG. 6 is a perspective view of a plate spring 16 which is a variation of the plate spring 6 shown in FIG. 2. The plate spring 16 is U-shaped and secured to the lid 4 by, for example, screw fasteners or the like and has a cover portion 16a which can cover the contacting surface 3a of the connector portion 3 of the main body 1. When the lid 4 is closed with the memory card 12 removed, the variation plate spring 16 is also elastically deformed, and the cover portion 16a completely covers the contacting surface 3a of the connector portion 3.

Therefore, the connector portion 3 of the main body 1 of the electronic device can be protected from dust just by closing the lid 4 with the memory card 12 removed.

Figure 7:
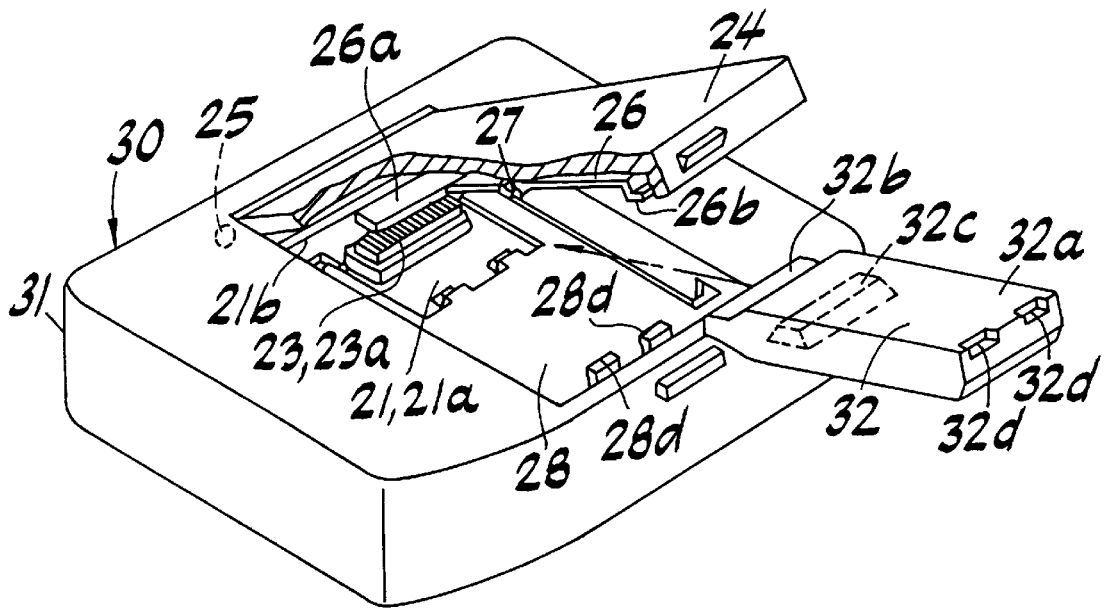
FIG. 7 is a perspective view of an electronic device incorporating a memory card installing device according to a second embodiment of this invention, and a memory card to be installed.

FIG. 7 is a perspective view of an electronic device incorporating a memory card installing device 30 according to a second embodiment of this invention, and a memory card 32 to be installed.

As shown in FIG. 7, a memory card installing portion 21a provided in a main body 21 of the electronic device 30 is provided with a moving plate 28 which is a slidable and rotatable moving member. A connector portion 23 is arranged to abut on a printed board 22 (see FIG. 9). The structure of the connector 23 is the same as that of the connector portion 3 of the first embodiment. The memory card installing portion 21a can be opened and closed by a lid 24 rotatably supported by a supporting shaft 25.

The lid 24 is provided on its installing portion side with a rotation lever 26, which is a connector cover member rotatably supported by a supporting shaft 27. The rotation lever 26 is provided on its connector portion side with a connector cover portion 26a for covering a contacting surface 23a of the connector portion 23, and on its memory card inserting side with a protrusion 26b.

Figure 8:
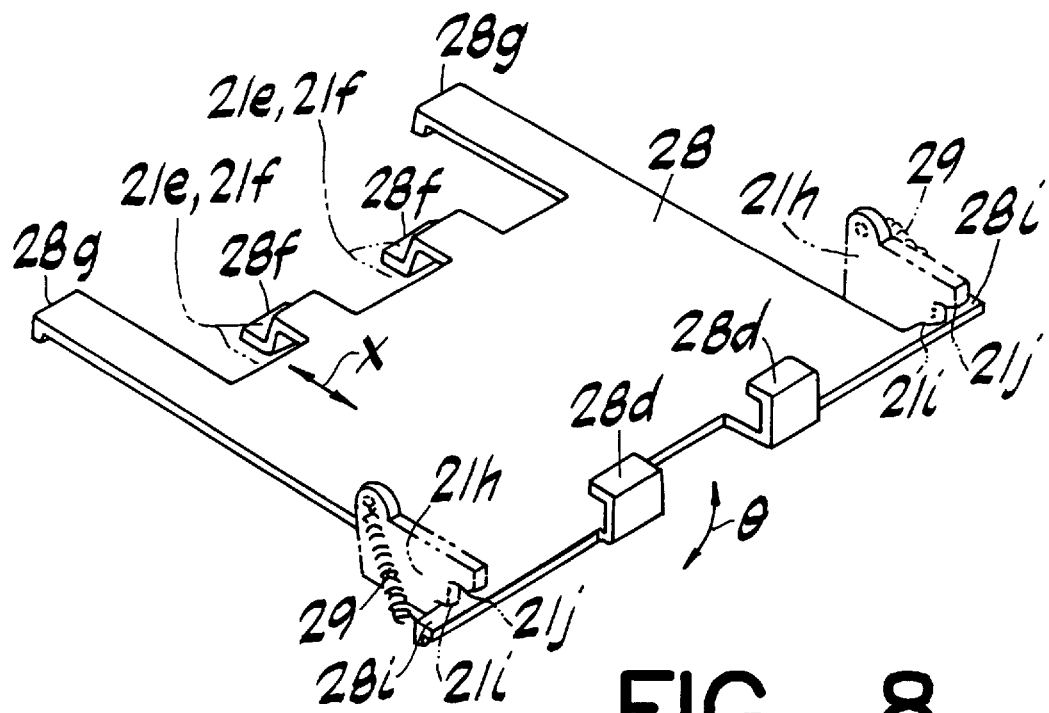
FIG. 8 is a perspective view of a moving plate applied to the memory card installing device of FIG. 7.
Figure 9:
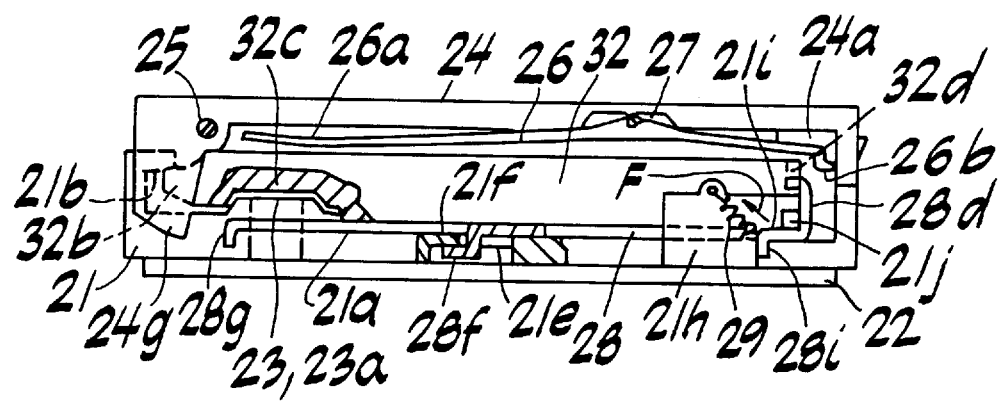
FIG. 9 is a cross-sectional view showing a state of the memory card installing device of FIG. 7 in which the memory card is inserted and a lid is completely closed.

As shown in a perspective view of FIG. 8 and a cross-sectional view of FIG. 9, the moving plate 28 is provided in its central part with two pawl portions 28f, which protrude downward and are bent to be L-shaped. The pawl portions 28f are engaged, slidably in the x-direction shown in FIG. 8, with supporting portions 21f which are edge portions of hole portions 21e provided in the installing portion 21a of the main body 21. At the same time, the pawl portions 28f enable the moving plate 28 to rotate in the θ-direction shown in FIG. 8.

The moving plate 28 is provided, at its opposite ends on the side of the connector portion 23, with bent abutting portions 28g, on which moving plate operating portions 24g (see FIG. 9) provided for the lid 24 can abut. The moving plate 28 is also provided on its memory card inserting side with two hook portions 28d bent inwardly so as to be U-shaped. The hook portions 28d are engageable with positioning recesses 32d of the memory card 32.

Further, two bent engaging projections 28i are provided in extended portions on both sides of the hook portions 28d of the moving plate 28. In accordance with the position of the moving plate 28, the engaging projections 28i can be selectively engaged with a first pair of lower steps 21i or a second pair of upper steps 21j provided in both side walls 21h of the main body 21 (see FIG. 9).

A pair of springs 29 are suspended between the walls 21h and the engaging projections 28i, and always urge the moving plate 28 in an upward slanting direction F shown in FIG. 9.

Next, the operation of installing and removing the memory card 32 in and from the electronic device 30 thus constructed is described by referring to FIG. 7 and FIGS. 9 to 14, which show cross-sectional views of the installed or removed state of the memory card. A casing 31 of the device 30 is omitted in FIGS. 9 to 14.

When the memory card 32 is installed, the lid 24 is opened and the memory card 32 is inserted in the installing portion 21a of the electronic device 30 from such a direction as shown in FIG. 7. A front end portion 32b of the memory card 32 is inserted in an inserting portion 21b of the main body 21 and the lid 24 is completely closed, as shown in the cross-sectional view of FIG. 9, which shows the completely installed state. In FIG. 9, the front end portion 32b of the memory card 32 is supported by the inserting portion 21b and the opposite end portion of the memory card 32 is pushed down by a pushing portion 24a of the lid 24. Further, the moving plate 28 is pushed down by the memory card 32 and disengages from the second steps 21j to slide backwards (toward the connector portion side) due to the urging force of the springs 29. The engaging projections 28i engage with the first steps 21i of the walls 21h, and the ends of the hook portions 28d fit in the recesses 32d of the memory card 32 to determine the position of the memory card 32.

When the memory card 32 is installed in the predetermined position, the contacting surface 23a of the connector portion 23 of the main body 21 and the connector 32c of the memory card 32 are pressed to contact each other, thereby forming an electrical connection. Thus, the electronic device 30 can transmit and receive data to and from the memory card 32. The lid 24 is maintained in the closed state of FIG. 9 by a locking member such as a pawl or the like provided to the lid 24.

Next, when the memory card 32 is removed from the electronic device 30, as shown in FIG. 10, the lid 24 is opened. As the lid 24 is opened, the operating portions 24g of the lid 24 pushes and moves the bent abutting portions 28g forward against the urging force F of the springs 29. The movement causes the hook portions 28d of the moving plate 28 to disengage from the recesses 32d of the memory card 32. The memory card 32 is lifted by a pushing force caused by an elastic deformation of the connector portion 23, as shown in FIG. 10.

The moving plate 28 is further moved forward by the operating portions 24g until the lid 24 is completely opened. As shown in FIG. 11, the projections 28i of the moving plate 28 disengage from the first steps 21i and engage with the second steps 21j as the moving plate 28 rotates in a counterclockwise direction. The rotation is made against the urging force F of the springs 29 with the pawls 28f at the center of rotation. This rotation causes the bent abutting portions 28g to disengage from the operating portions 24g.

Figure 12:
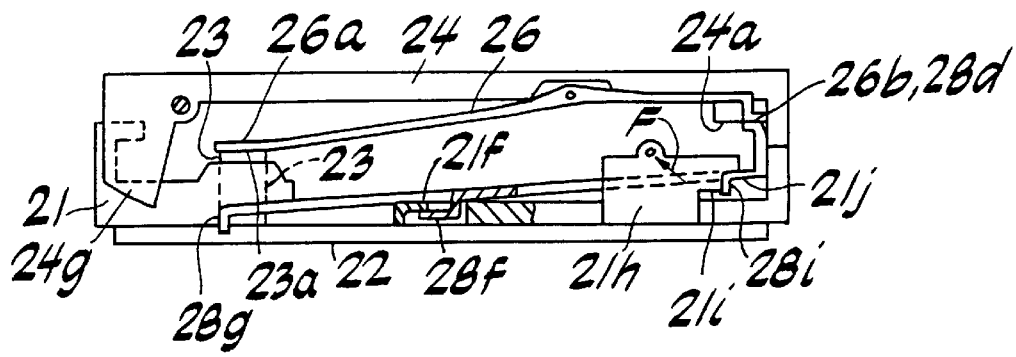
FIG. 12 is a cross-sectional view showing a state of the memory card installing device of FIG. 7 in which the lid is closed after the memory card is removed.

After the memory card 32 is removed with the lid 24 open, the lid 24 is closed, as shown in FIG. 12. At this time, the pushing protrusion 26b of the rotation lever 26 is pushed against the end of the hook portions 28d of the moving plate 28 engaging with the second steps 21j. The connector cover portion 26a on the opposite side covers the contacting surface 23a of the connector portion 23 of the main body 21 without any gap therebetween.

Figure 13:
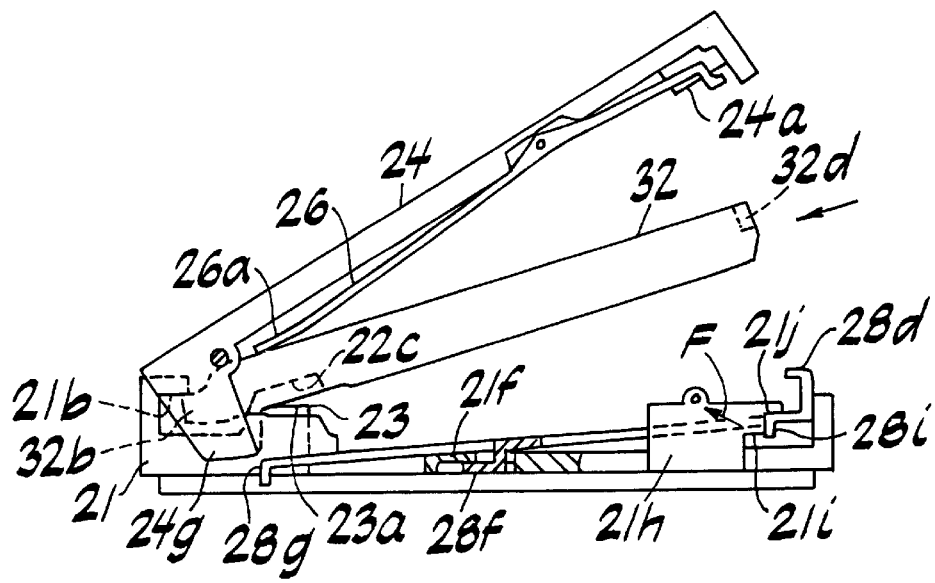
FIG. 13 is a cross-sectional view showing a state of the memory card installing device of FIG. 7 in which the lid is opened and the memory card is inserted.
Figure 14:
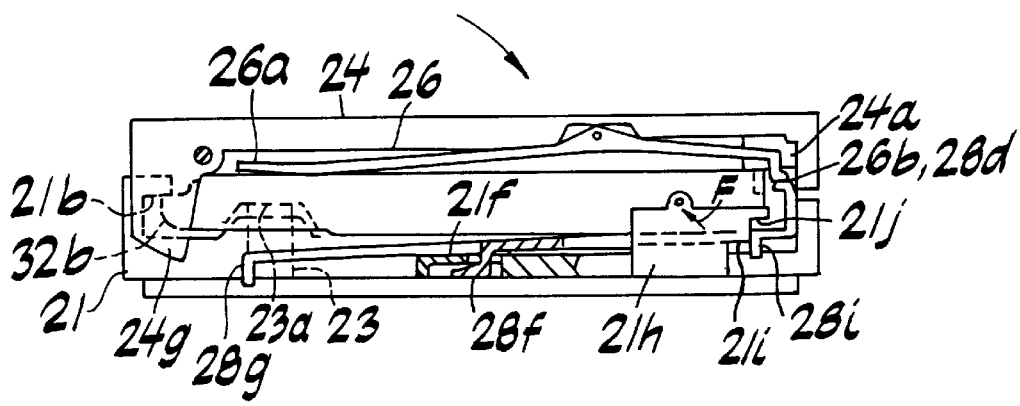
FIG. 14 is a cross-sectional view showing a state of the memory card installing device of FIG. 7 in which the lid is being closed after the state shown in FIG. 13.

In order to install the memory card 32, the lid 24 is opened and the front end portion 32b of the memory card 32 is inserted in the inserting portion 21b of the main body 21, as shown in FIG. 13. Then the lid 24 is closed. FIG. 14 shows a state immediately before the lid 24 is completely closed. The memory card 32 pushed by the pushing protrusion 24a pushes the moving plate 28. The moving plate 28 rotates clockwise against the urging force of the springs 29 with the pawl portions 28f being the center of rotation, so that the engaging projections 28i disengage from the second steps 21j.

When the lid 24 is completely closed, the memory card installing device is in the state shown in FIG. 9. The projections 28i of the moving plate 28 disengage from the second steps 21j to slide backward (toward the connector portion 23), and then engage with the first steps 21i. Thus, the hook portions 28d fit into the recesses 32d of the memory card 12 to define the position of the memory card 32. The connector portion 23 of the main body 21 and the connector portion 32c of the memory card 32 are pressed to contact with each other and are electrically connected.

Thus, the connector portion 23 of the main body 21 can be protected from dust by closing the lid 24 with the memory card 32 removed.

What is claimed is:

1. A device for installing a memory card, comprising:
   a memory card installing portion having a connector portion;
   a lid for opening and closing the memory card installing portion; and
   a connector cover member for directly covering the connector portion when the memory card is not installed in a predetermined position and the lid is closed.

2. The device according to claim 1, wherein the connector cover member is coupled to the lid.

3. The device according to claim 2, wherein the connector cover member is an elastic member disposed between the memory card and the lid when the memory card is installed in the predetermined position, and wherein the connector cover member covers the connector portion when the memory card is not installed in the predetermined position and the lid is closed.

4. The device according to claim 3, wherein the elastic member is elastically deformed to push the connector portion when the elastic member covers the connector portion.

5. The device according to claim 3, wherein the elastic member separates the memory card from the lid when the lid is open.

6. The device according to claim 4, wherein the elastic member separates the memory card from the lid when the lid is open.

7. The device according to claim 2, further comprising a moving member, wherein the moving member is in one of a plurality of moving member positions when the memory card is installed in the predetermined position, wherein the moving member is in another one of the plurality of moving member positions when the memory card is removed from the predetermined position, wherein the connector cover member is rotatably coupled to the lid, and wherein, when the lid is closed without the memory card being installed, the moving member is moved to push and rotate the connector cover member to cover the connector portion.

8. The device according to claim 7, wherein the moving member comprises a hook member for positioning the memory card when the memory card is installed in the predetermined position.

9. The device according to claim 7, wherein the moving member is slidable and rotatable.

10. The device according to claim 8, wherein the moving member is slidable and rotatable.

11. A device for installing a memory card, comprising:
    a memory card installing portion having a connector portion;
    a lid for opening and closing the memory card installing portion; and
    an elastic member disposed between the memory card and the lid when the memory card is installed in a predetermined position, and wherein the elastic member covers the connector portion when the memory card is not installed in the predetermined position and the lid is closed.

\* \* \* \* \*